(12) United States Patent
Slurink

(10) Patent No.: US 10,583,997 B2
(45) Date of Patent: Mar. 10, 2020

(54) SIMULATED CIGARETTE PARTS REORIENTING APPARATUS

(71) Applicant: Sluis Cigar Machinery B.V., Kampen (NL)

(72) Inventor: Oscar Slurink, Heino (NL)

(73) Assignee: SLUIS CIGAR MACHINERY B.V., Kampen (NL)

( * ) Notice: Subject to any disclaimer, the term of this patent is extended or adjusted under 35 U.S.C. 154(b) by 0 days.

(21) Appl. No.: 16/317,878

(22) PCT Filed: Jul. 18, 2017

(86) PCT No.: PCT/NL2017/050484
§ 371 (c)(1),
(2) Date: Jan. 15, 2019

(87) PCT Pub. No.: WO2018/016950
PCT Pub. Date: Jan. 25, 2018

(65) Prior Publication Data
US 2019/0152717 A1    May 23, 2019

(30) Foreign Application Priority Data
Jul. 20, 2016 (NL) ..................................... 2017196

(51) Int. Cl.
*B65G 47/24* (2006.01)
*A24F 47/00* (2020.01)
(Continued)

(52) U.S. Cl.
CPC ............ *B65G 47/24* (2013.01); *A24F 47/008* (2013.01); *B65G 29/00* (2013.01); *B65G 47/5136* (2013.01); *B65G 2201/0226* (2013.01)

(58) Field of Classification Search
CPC ................... B65G 47/24; B65G 29/00; B65G 2201/0261; B65G 35/06; B65G 47/244;
(Continued)

(56) References Cited

U.S. PATENT DOCUMENTS 3,119,482 A     1/1964  Ganz
4,174,775 A *  11/1979  McKnight .......... B65G 47/1457
                                                       198/397.05
(Continued)

FOREIGN PATENT DOCUMENTS

DE          3728291 A1    3/1989
WO       2012077147 A1    6/2012
WO       2016105191 A1    6/2016

OTHER PUBLICATIONS

International Search Report and Written Opinion dated Nov. 21, 2017 for Application No. PCT/NL2017/050484.
Search Report dated Apr. 4, 2017 for Application No. NL 2017196.

*Primary Examiner* — James R Bidwell
(74) *Attorney, Agent, or Firm* — Patterson + Sheridan, LLP

(57) ABSTRACT

The present invention relates to a reorienting device for reorienting simulated cigarette parts which are carried by a product carrier, wherein the device comprises: a main vertical rotation axis; a first cam track extending at least partially around the main vertical rotation axis; a rotary carrousel configured to rotate about the main vertical rotation axis, the rotary carrousel comprising: a rotary support frame, a plurality of reorienting units connected to the rotary support frame, each reorienting unit comprising an engagement member, wherein each engagement member is configured to engage the simulated cigarette part and to reorient it about a vertical product axis, a plurality of transmission mechanisms connected to the rotary support frame, each transmission mechanism being associated with a respective
(Continued)

reorienting unit, each transmission mechanism comprising a cam which moves along the first cam track during the rotation of the rotary support frame.

20 Claims, 11 Drawing Sheets

(51) Int. Cl.
*B65G 47/51* (2006.01)
*B65G 29/00* (2006.01)

(58) Field of Classification Search
CPC .. B65G 47/846; B65G 21/04; B65G 47/5136; A24F 47/008; A24F 47/00
USPC ................. 198/397.04, 397.05, 400, 414
See application file for complete search history.

(56) References Cited

U.S. PATENT DOCUMENTS

| | | | | |
|---|---|---|---|---|
| 5,172,801 | A * | 12/1992 | Georgitsis | B23Q 7/18 198/346.2 |
| 8,136,651 | B2 * | 3/2012 | Cassoni | B67B 3/0645 198/397.01 |
| 9,862,515 | B2 * | 1/2018 | Pedercini | B65C 9/067 |
| 2009/0151305 | A1 * | 6/2009 | Cassoni | B67B 3/0645 53/485 |
| 2015/0083550 | A1 | 3/2015 | Wilson et al. | |
| 2018/0079602 | A1 * | 3/2018 | Balletti | B65G 47/53 |
| 2018/0127218 | A1 * | 5/2018 | Kalany | B65G 47/32 |
| 2018/0170596 | A1 * | 6/2018 | Marcantoni | B65B 35/58 |

* cited by examiner

SIMULATED CIGARETTE PARTS REORIENTING APPARATUS

FIELD OF THE INVENTION

The present invention relates to a reorienting device for reorienting simulated cigarette parts (also: parts) relative to a product carrier in which they are supported to a predetermined orientation. The parts are received from a first track, reoriented and delivered to a second track in the predetermined orientation relative to the product carrier. The present invention also relates to a method of reorienting simulated cigarette parts.

BACKGROUND OF THE INVENTION

In a manufacturing process of parts of a simulated cigarette (or e-cigarette) various processing operations generally need to be carried out on the parts. The parts are generally carried by a product carrier. The parts may be relatively small and may be quite fragile. The processing operations may need to be carried out in a specific way.

In the present invention it was recognized that the possibilities of controlling the position and orientation of these parts relative to the product carrier during the various processing steps in an assembly line are limited. In particular, the orientation of the parts may be random during the conveying of the parts through an assembly line, and this may seriously hinder a processing operation. For instance, the parts may simply have a wrong orientation so that it becomes impossible to carry out the processing operation.

OBJECT OF THE INVENTION

It is an object of the invention to provide a reorienting device which reorients simulated cigarette parts which are carried by a product carrier in an assembly line from a first orientation to a second, predetermined orientation. The first orientation may be a random orientation.

It is yet another objective to provide a device that continuously performs the reorientation of the simulated cigarette parts, and does so in a reliable manner.

The same objects apply to the methods according to the invention.

SUMMARY OF THE INVENTION

In order to achieve at least one of the mentioned objects, the invention relates to a reorienting device for reorienting simulated cigarette parts which are carried by a product carrier about a vertical product axis from a first angular orientation to a second, predetermined orientation relative to said product carrier, the reorienting device comprising:
 a main vertical rotation axis;
 a first cam track extending at least partially around the main vertical rotation axis;
 a rotary carrousel configured to rotate about the main vertical rotation axis, the rotary carrousel comprising;
  a rotary support frame;
  a plurality of reorienting units connected to the rotary support frame and arranged in a circular configuration when viewed in top view, each reorienting unit comprising an engagement member, wherein each engagement member is configured to engage the simulated cigarette part and to reorient it about the vertical product axis, wherein each reorienting unit comprises a first section which is rotatable relative to the rotary support frame about a vertical unit axis and is movable in a vertical direction between an upper position and a lower position, the upper position being a retracted position and the lower position being an engagement position;
  a plurality of transmission mechanisms connected to the rotary support frame, each transmission mechanism being associated with a respective reorienting unit, each transmission mechanism comprising a cam which moves along the first cam track during the rotation of the rotary support frame, wherein the transmission mechanisms convert a movement of the cam into a rotation of the first section of the reorienting unit about the vertical unit axis relative to the rotary support frame;
 a moving device for moving the product carriers, the moving device comprising:
  a circular track located underneath the reorienting units and configured to guide the product carriers holding the simulated cigarette parts;
  a plurality of product carrier movers for moving the product carriers along the circular track underneath the reorienting units,
 a second cam track configured to vertically displace the first section of the reorienting units.

The present invention was found to provide a reliable and effective way of reorienting the products in their product carriers.

In an embodiment, the first section of the reorienting unit is movable between an upper position and a lower position and the second section is fixed in a direction of the unit axis.

In an embodiment, the resilient member of the reorienting unit vertically displaces the first section and biases the first section in a downward direction.

In an embodiment, the first cam track has a varying radius R relative to the main axis of rotation causing a radial movement of the cam when the cam travels along the first cam track during the rotary movement of the rotary carrousel.

In an embodiment, each transmission mechanism comprises a transmission gear which is attached to the cam. Each reorienting unit comprises an actuating gear. The actuating gear extends around the unit axis and engages the transmission gear of the transmission mechanism. A radial movement of the cam results in a movement of the transmission gear. The movement of the transmission gear results in turn in a movement of the actuating gear.

In an embodiment, the second cam track comprises:
 an upward slope section wherein each reorienting unit arrives at an upstream end of the upward slope section in a lower position and in an engaged state with a simulated cigarette part, wherein the reorienting units engage the upward slope section and are moved upwards by the upward slope section, thereby causing a disengagement of the reorienting units from the simulated cigarette parts;
 a downward slope section located downstream from the upward slope section. The downward slope section displaces the first section of each reorienting unit in a downward direction. This makes it possible to engage the first section of each reorienting unit with a next simulated cigarette part.

In an embodiment, the second cam track further comprises a substantially horizontal section located downstream from the upward slope section and upstream from the downward slope section, wherein the reorienting units arrive at the substantially horizontal section after having been moved upward by the upward slope section, wherein the first section of each reorienting unit is in the upper position when travelling along the substantially horizontal section.

In an embodiment, the first cam track extends in a plane substantially perpendicular to the main vertical rotation axis.

In an embodiment, the first and second cam tracks are stationary.

In an embodiment, the first cam track is endless.

In an embodiment, the second cam track extends along a part of the trajectory of the reorienting units.

The rotary carrousel may make a continuous movement, in particular a rotary movement.

In an embodiment, each engagement member is provided at the lower end of the respective reorienting unit and engages an upper side of the simulated cigarette part.

In an embodiment, the first section comprises the engagement member which comprises a first mating part configured to engage a second mating part provided at the upper side of the simulated cigarette part.

In an embodiment, the first mating part comprises a male or female centering part configured to concentrically align the engagement member with the simulated cigarette part, wherein a center of the first mating part is located on the vertical unit axis, and wherein the centering part protrudes beyond one or more side protrusions, which one or more side protrusions extend radially outward from the vertical unit axis.

In an embodiment, the male or female centering part is conical.

In an embodiment, the first section has the engagement member which in turn has a protrusion which engages a mating shape provided in the upper side of the simulated cigarette part.

In an embodiment, the first angular orientation of the simulated cigarette parts is arbitrary and the engagement member:
  engages the simulated cigarette part and
  slides over the upper surface of the simulated cigarette part in a rotary manner until it fits into the mating shape of the simulated cigarette part, and
  subsequently presses into the mating shape by the force of the resilient member, and
  subsequently rotates the simulated cigarette part relative to the product carrier to the second, predetermined orientation.

In an embodiment, the second angular orientation is a predetermined orientation.

In an embodiment, the product carrier movers maintain the angular position of the product carriers when the simulated cigarette parts which are held by the product carriers are reoriented.

The present invention further relates to a method for reorienting simulated cigarette parts, the method comprising:
  feeding product carriers to the track of the reorienting device, and moving the product carriers along said track, wherein each product carrier carries a simulated cigarette part;
  engaging the simulated cigarette part with the engagement member of the first section of each reorienting unit by a downward movement of the first section of the reorienting unit, and;
  rotating the simulated cigarette part relative to the product carrier by a rotary movement of the reorienting unit.

In an embodiment of the method:
  each cam is moved along the first cam track during the rotary movement of the carrousel, wherein the first cam track has a varying radius R causing a radial movement of the cam when the cam travels along the first cam track;
  each transmission gear attached to its respective cam rotates about its axis when the cam moves radially and engages the actuating gear of the reorienting unit and rotates the reorienting unit;

In an embodiment of the method, the vertical displacement of the first section of the reorienting units comprises the steps:
  a) moving the reorienting unit by the rotary support frame, wherein the first section of the reorienting unit is in the lower position and is engaged with a simulated cigarette part;
  b) moving the reorienting unit along the upward slope section of the second cam track, wherein the first section of each reorienting unit is moved upward and disengages from the simulated cigarette part;
  c) moving the reorienting unit along the substantially horizontal section of the second cam track, wherein the first section of each reorienting unit is in the upper position and not engaged with any simulated cigarette part;
  d) moving the reorienting unit along the downward slope section, wherein the first section of each reorienting unit is vertically displaced in a downward direction as it moves along the downward slope section and engages a new simulated cigarette part;
  e) moving the reorienting unit further along the track and rotating the reorienting unit, thereby reorienting the simulated cigarette part relative to the product carrier.

In an embodiment of the method step e) entails pressing the protrusion into a recess of the simulated cigarette part due to the force of the resilient member, thereby reaching the lowest position of the first section of the reorienting unit.

In an embodiment of the method the first angular orientation of the simulated cigarette parts is arbitrary and the engagement member engages the simulated cigarette part carried by a product carrier, the method comprising:
  sliding the engagement member over the upper surface of the simulated cigarette part in a rotary manner until the engagement member fits into the mating shape of the simulated cigarette part, and
  pressing the engagement member into the mating shape by the force of the resilient member, and
  subsequently rotating the simulated cigarette part relative to the product carrier.

In an embodiment of the method the vertical displacement of the first section of the reorienting units takes place during the rotary movement of the reorienting units about the main vertical rotation axis.

These and other aspects of the invention will be more readily appreciated as the same becomes better understood by reference to the following detailed description and considered in connection with the accompanying drawings in which like reference symbols designate like parts.

DETAILED DESCRIPTION OF THE FIGURES

Figure 1:
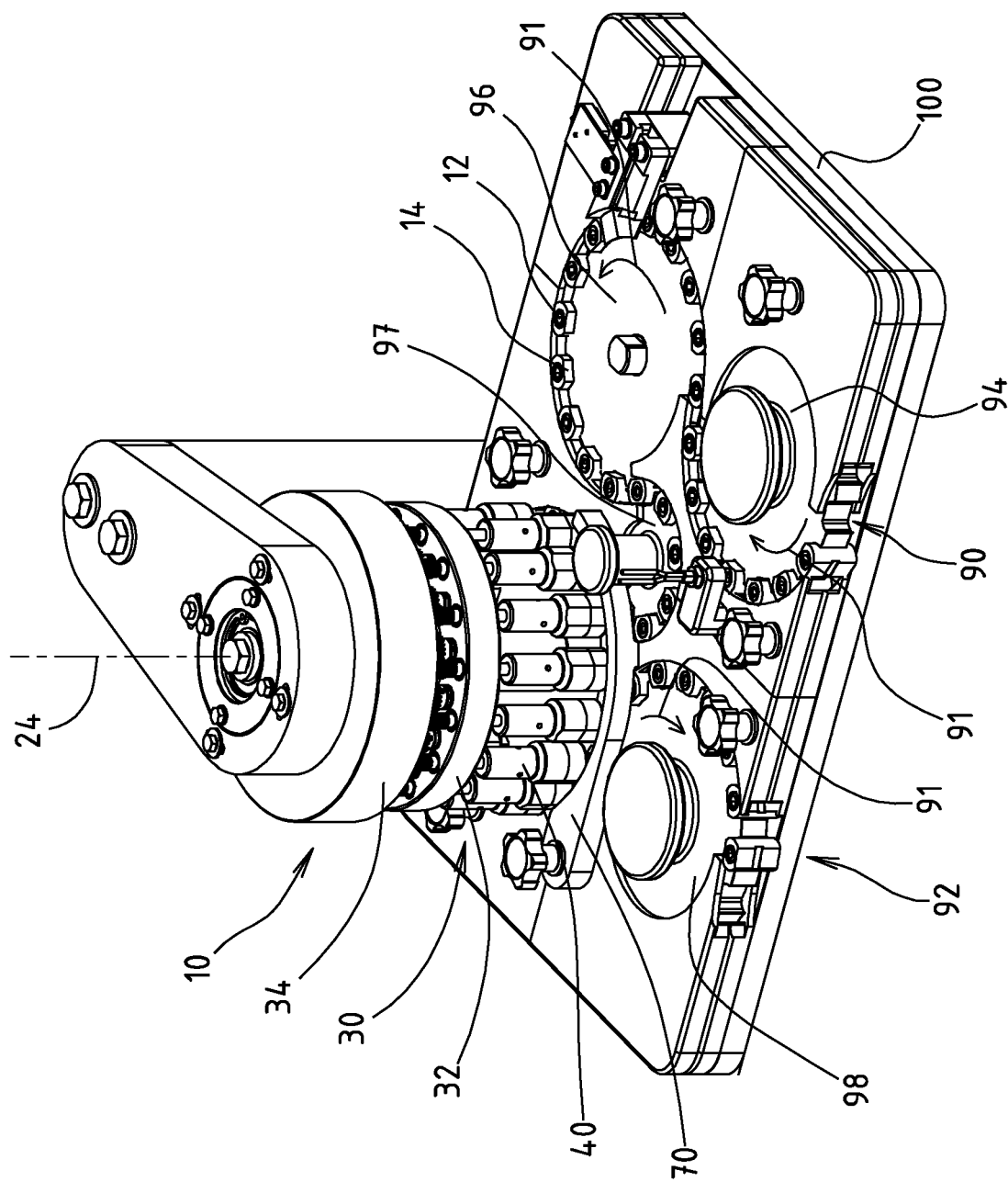
FIG. 1 shows a general isometric view of an embodiment of the invention.
Figure 6:
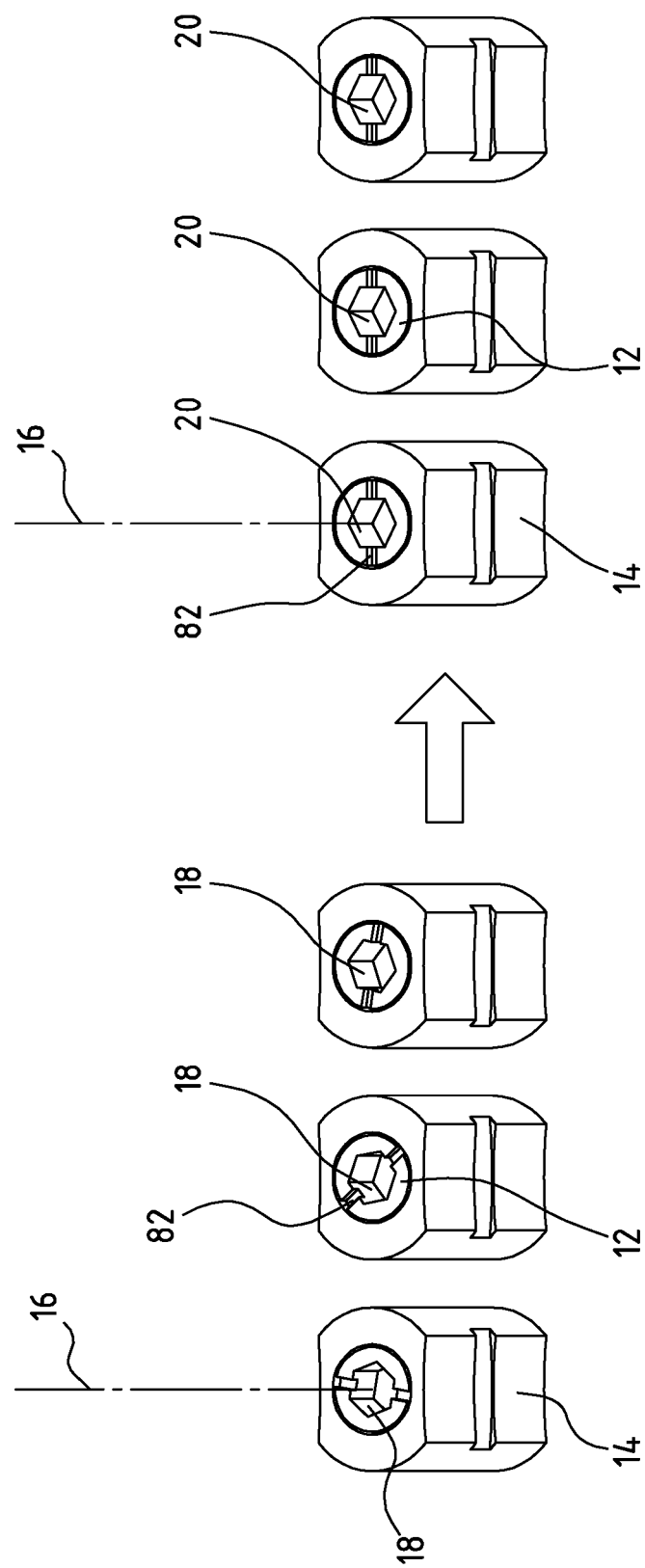
FIG. 6 shows a schematic view of the simulated cigarette parts in the product carriers being reoriented from a first, arbitrary orientation to a second, predetermined orientation.
Figure 7:
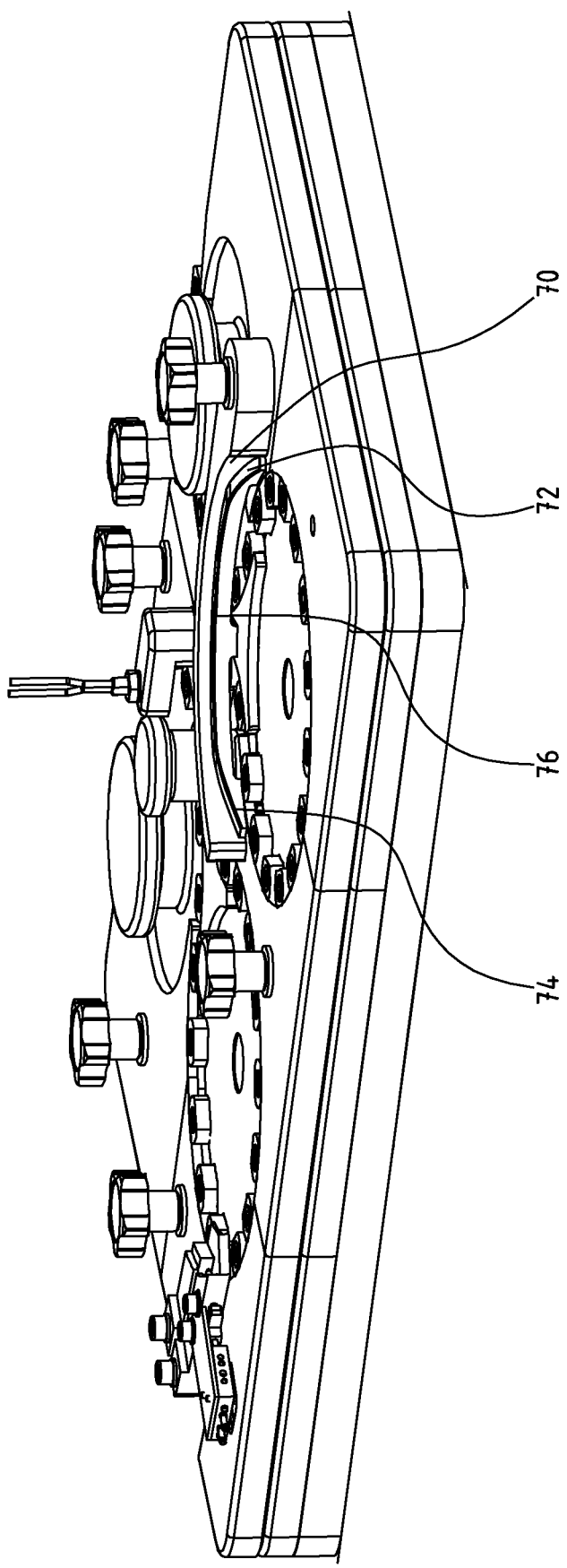
FIG. 7 shows an isometric view of an embodiment of the invention, in particular the second cam track.

Turning to FIGS. 1 and 6, a simulated cigarette part reorienting device 10 is shown for reorienting simulated cigarette parts 12 which are carried by a product carrier 14. The simulated cigarette parts 12 are reoriented about a vertical product axis 16 from a first angular orientation 18 to a second, predetermined orientation 20 relative to said product carrier.

The product carriers carrying the parts are transported along a track starting at entrance 90 and ending at exit 92. The product carriers are guided by the conveyors 94, 96, 97 and 98 in the direction indicated by the arrows 91. The reorienting device is located downstream from conveyor 97 and upstream from conveyor 98. The tracks are supported by the track support frame 100.

The reorienting device has a first cam track 22 (shown in FIG. 2) extending around a main vertical rotation axis 24 and having a varying radius R. The cam track is supported by a cam track support 34. Due to the varying radius R, cams 52 following the cam track move radially during the rotary movement of a rotary carrousel 30. The rotary carrousel rotates about the main vertical rotation axis and comprises a rotary support frame 32 configured to rotate about the main vertical rotation axis.

The first cam track 22 has a varying radius R relative to the main vertical rotation axis 24. The varying radius R causes a radial movement of the cam 52 when the cam travels along the first cam track during the rotary movement of the rotary carrousel. The first cam track is also endless and extends in a plane substantially perpendicular to the main vertical rotation axis 24.

Figure 2:
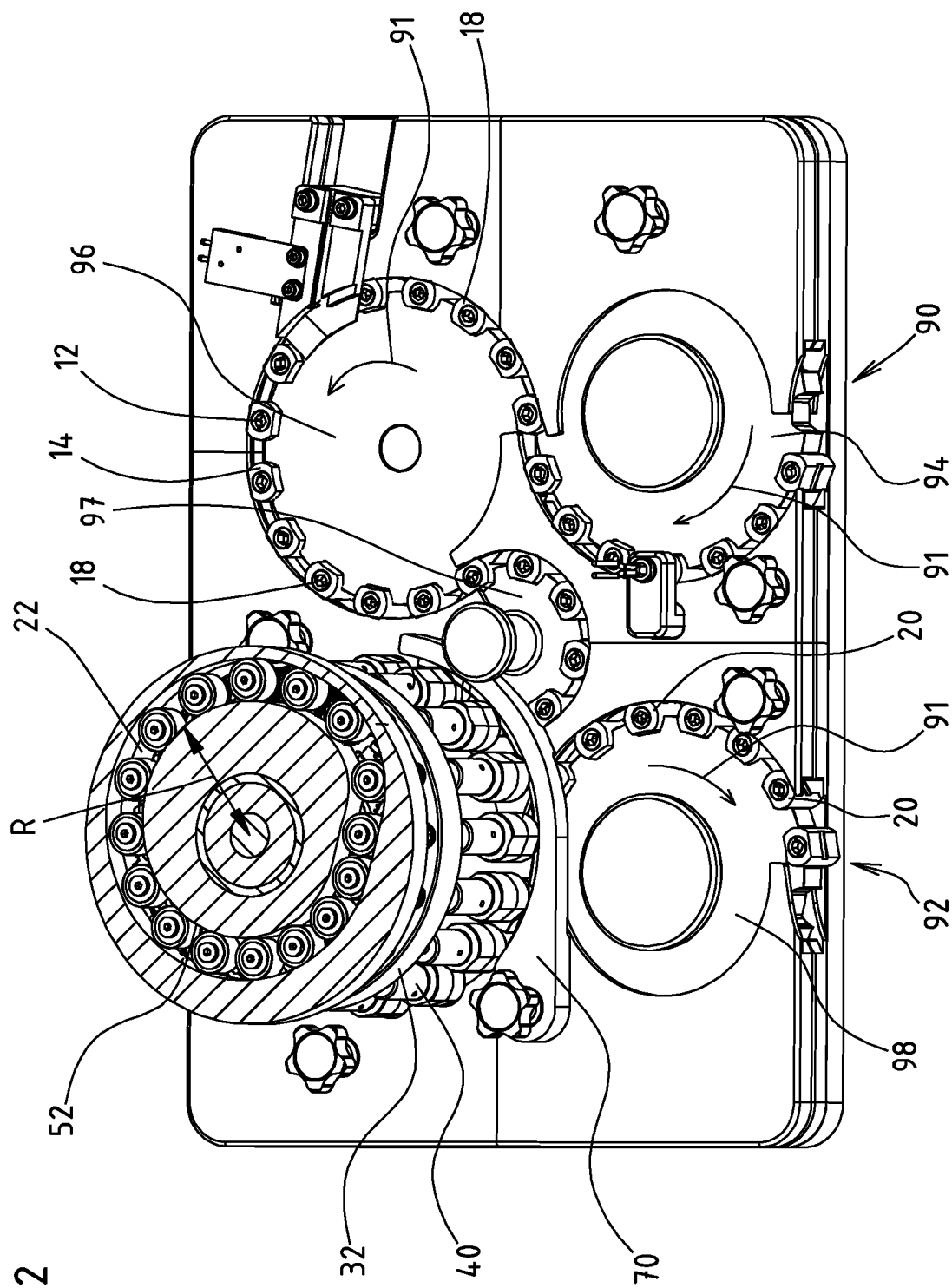
FIG. 2 shows an isometric view of an embodiment of the invention with a horizontal cross-section through the first cam track.
Figure 8:
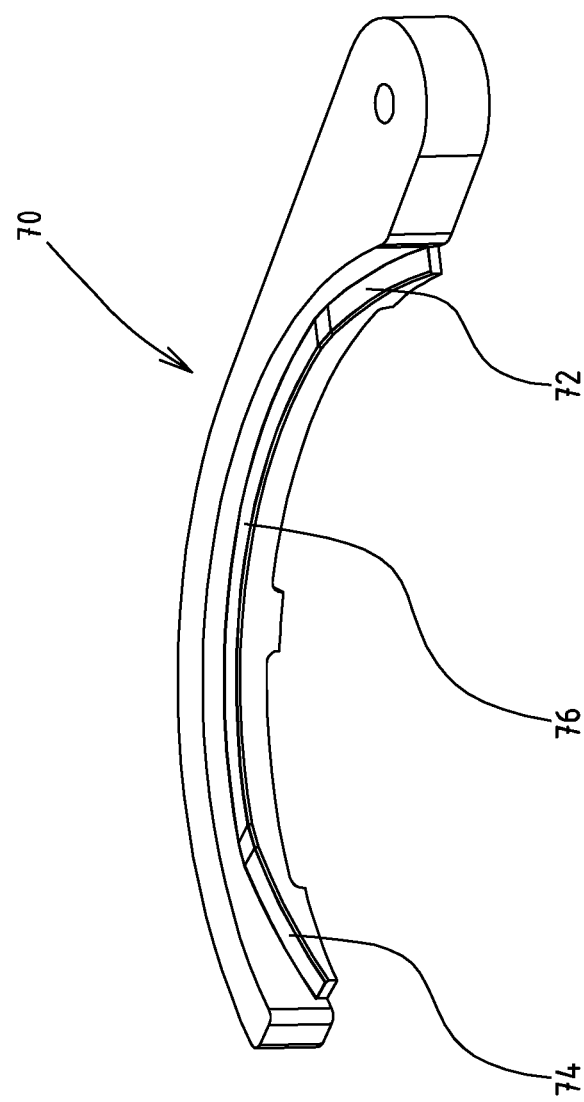
FIG. 8 shows an isometric view of the second cam track.

Turning to FIGS. 1, 2 and 8, a second cam track 70 is provided around a trajectory of the circular track 62. The second cam track 70 induces a vertical displacement of the first section of the reorienting units 40. Both the first cam track 22 and the second cam track are stationary.

Figure 3:
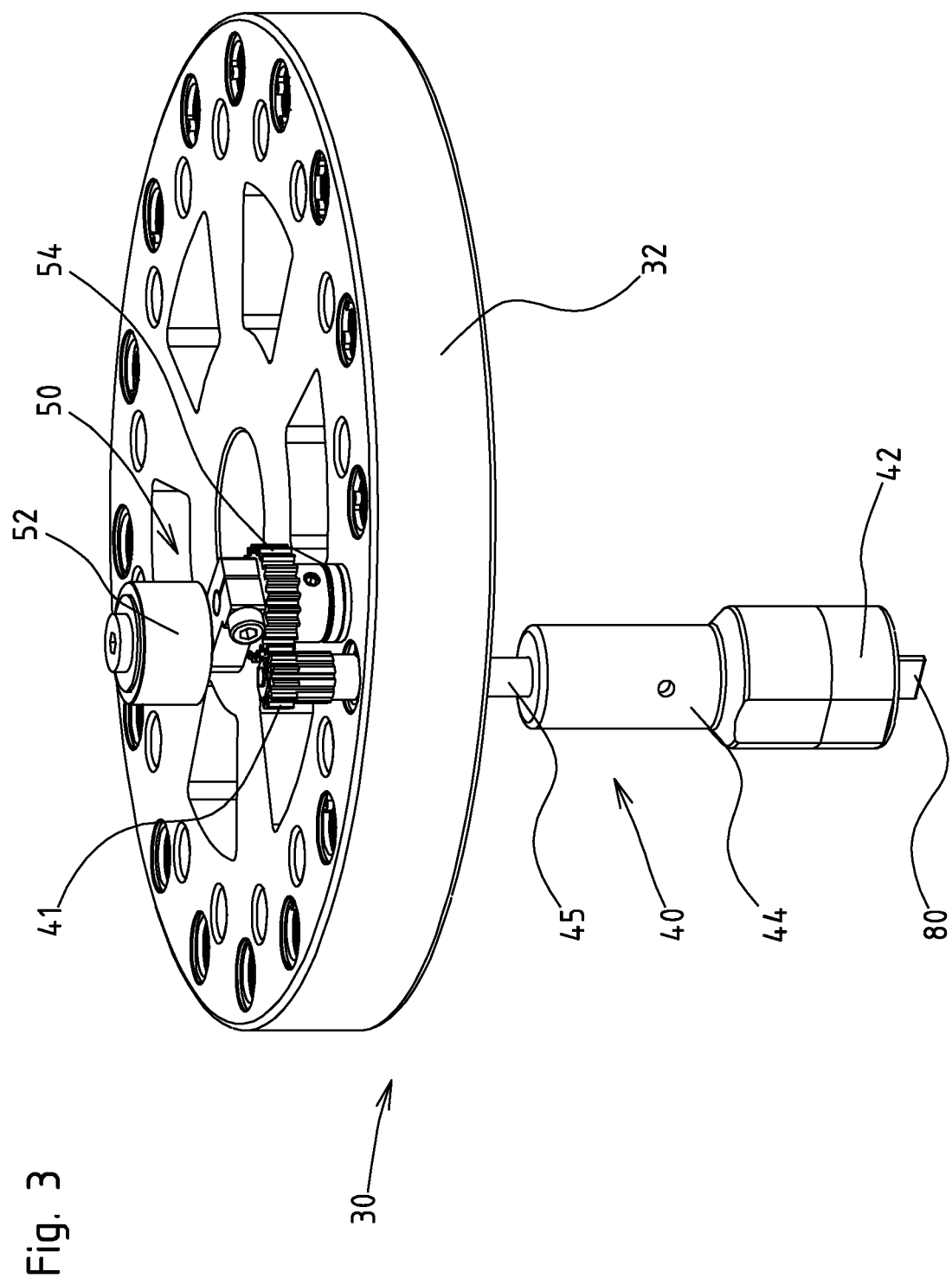
FIG. 3 shows an isometric view of the rotary support frame with a transmission mechanism and a reorienting unit.

FIG. 3 shows the rotary carrousel 30. A plurality of reorienting units 40 are connected to the rotary support frame 32. Although only one reorienting unit is shown, the skilled person will understand that the invention comprises a plurality of reorienting units. They are arranged in a circular configuration when viewed in top view. Each reorienting unit 40 projects downward from the rotary support frame through an opening in the rotary support frame.

Each reorienting unit 40 is constructed with a second section 45 which is fixed in vertical direction relative to the rotary support frame 32.

The rotary carrousel 30 further comprises a plurality of transmission mechanisms 50 connected to the rotary support frame 32. FIG. 3 only shows one transmission mechanism, but the skilled person will understand that the invention discloses a plurality of transmission mechanisms. Each transmission mechanism is associated with a reorienting unit 40. The transmission mechanism comprises a cam 52 which moves along the first cam track 22 during the rotation of the rotary support frame. The transmission mechanism converts a movement of the cam into a rotation of the first section 44 of the reorienting unit about the vertical unit axis relative to the rotary support frame.

Figure 5:
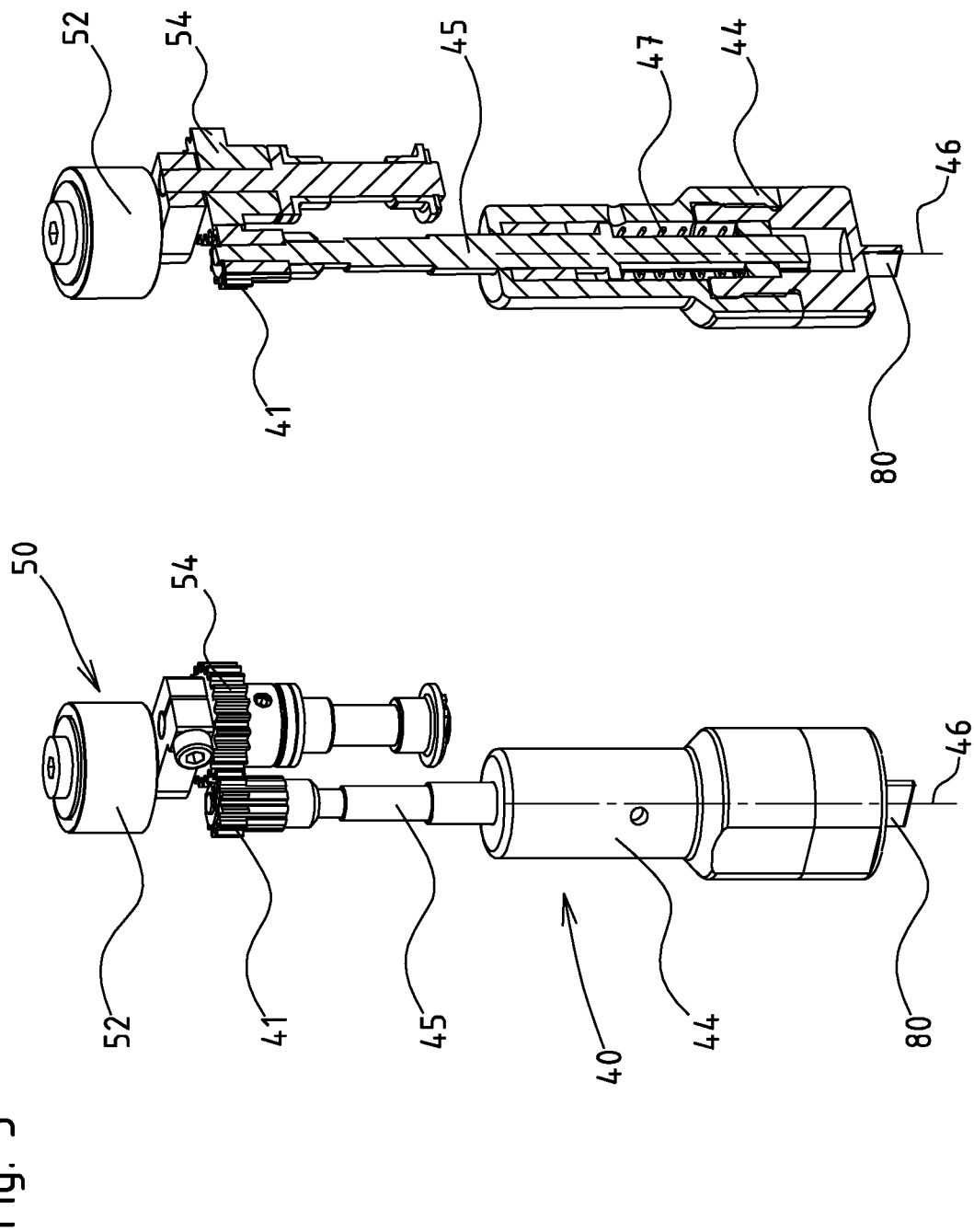
FIG. 5 shows an isometric view and a cross-sectional view of a transmission mechanism and a reorienting unit.

The transmission mechanism 50 as shown in FIGS. 3 and 5 comprises a transmission gear 54 which is attached to the cam 52. Each reorienting unit comprises an actuating gear 41 which extends around the unit axis and engages the transmission gear of the transmission mechanism. A radial movement of the cam results in a movement of the transmission gear. This will result in turn in a movement of the actuating gear.

Figure 4:
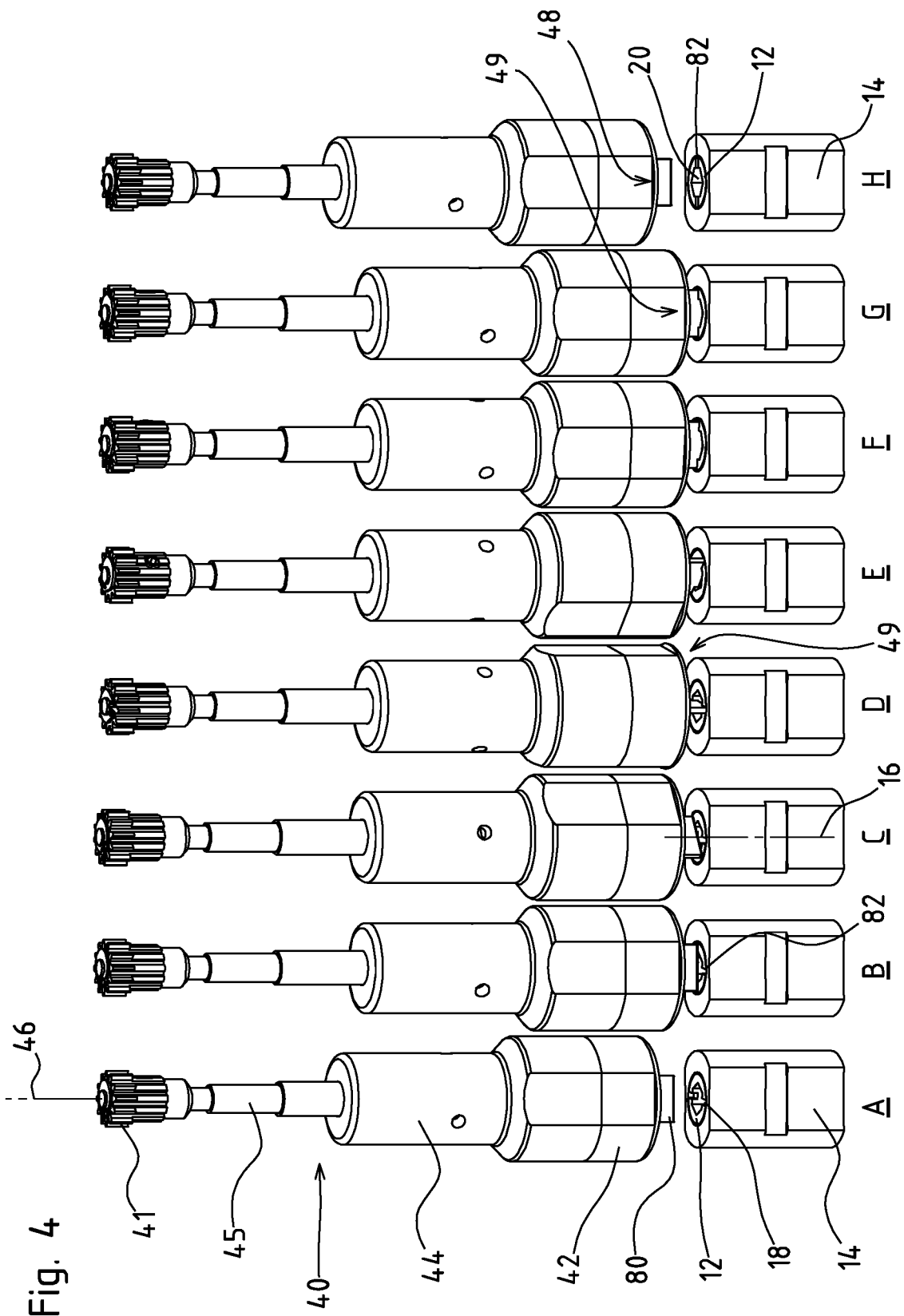
FIG. 4 shows a schematic view of the simulated cigarette parts in the product carriers being engaged, reoriented and disengaged with the engagement member of the reorienting unit.

Turning to FIG. 4, each reorienting unit 40 consists of an engagement member 42 which engages the simulated cigarette part. The engagement member may comprise a protrusion 80 and/or a recess. After engaging the simulated cigarette part, the engagement member reorients it about the vertical product axis 16 relative to the product carrier. The reorienting unit itself comprises a first section 44 that rotates about a vertical unit axis 46 relative to the rotary support frame. The first section can move in a vertical direction between an upper position 48 and a lower position 49. The upper position is a retracted position and the lower position is an engagement position.

Each engagement member 42 is provided at the lower end of the respective reorienting unit 40. The first section of the reorienting unit comprises the said engagement member. An upper side of the simulated cigarette parts comprises a mating shape. This may be a protrusion or a recess, or a combination. In case of a recess, the engagement member comprises a mating protrusion 80. The protrusion then engages and fit in the mating shape of the simulated cigarette part during operation.

FIG. 4 shows a schematic view of the vertical movement of the first section, wherein FIGS. 4A and 4H depict the upper position and FIGS. 4D-4G depict the lower, engagement position. In FIGS. 4B and 4C the first section is also engaged, but not in its lower position. The skilled person will understand that the reorienting units are configured in a circular manner instead of the linear representation of FIG. 4.

FIG. 4A shows the reorienting unit 40 in the upper position 48. FIG. 4B shows the engagement member 42, the protrusion 80 in contact with the upper side of the simulated cigarette part. From FIG. 4B to FIG. 4C, the protrusion slides over the upper side of the part carried by the product carrier in a rotary manner. The protrusion keeps on rotating and sliding over the upper side until the protrusion is positioned exactly above the mating shape 82, in this case a recess. The resilient member 47 (FIG. 5) forces the protrusion into the mating shape. This is shown in FIG. 4D and the first section 44 of the reorienting unit is in the lower position 49.

Figure 11A:
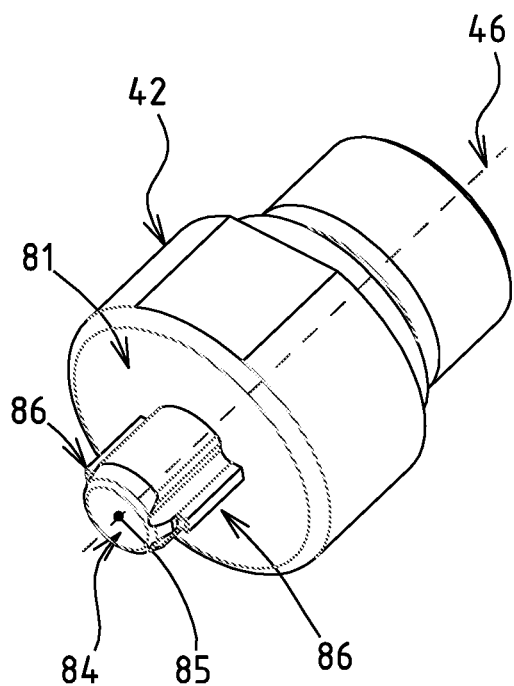
FIGS. 11A and 11B show a schematic view of embodiments of the engagement member.
Figure 11B:
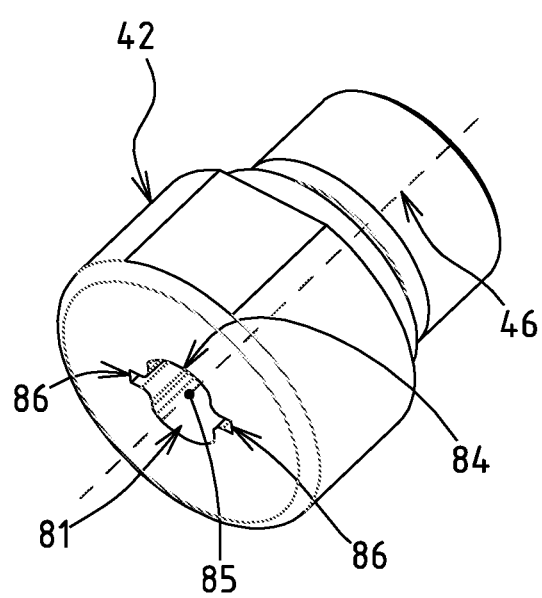
Figure 11C:
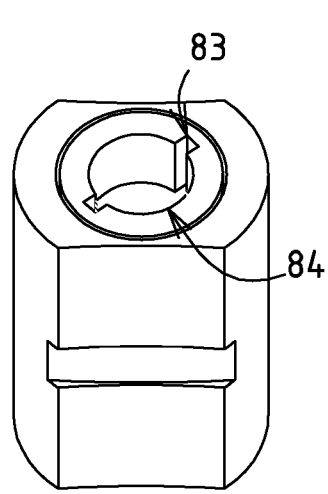
FIGS. 11C and 11D show a schematic view of embodiments of mating parts.
Figure 11D:
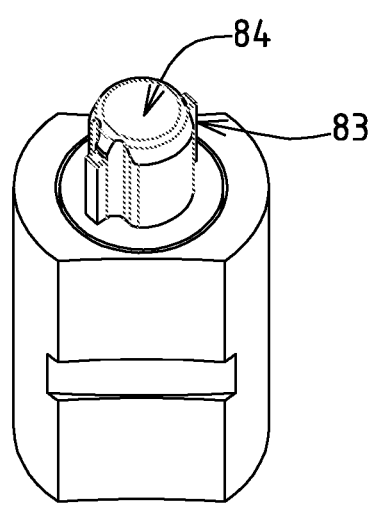

FIGS. 11A-11D show more generally a first mating part 81 provided on the engagement member 42. In FIG. 11A the first mating part 81 is a protruding part, whereas the first mating part 81 in FIG. 11B is a recess. Both configurations are possible, as long as the simulated cigarette part has a second mating part 83 at an upper side thereof which mates with the first mating part. If the first mating part 81 is protruding, then the second mating part 83 has at least a recess to accommodate the protruding part of the first mating part 81, or vice versa.

FIG. 11A further shows the first mating shape 81 comprising a male or female centering part 84 configured to concentrically align the engagement member with the simulated cigarette part. This speeds up the engagement of the engagement member with the simulated cigarette part. It also increases the reliability. A center 85 of the first mating shape is located on the vertical unit axis 46. The centering part 84 protrudes beyond one or more side protrusions 86, in the shown embodiment beyond two side protrusions 86. The side protrusions 86 extend radially outward from the vertical unit axis 46. The male or female centering part is conical.

Next the reorienting unit, and thus the protrusion rotates due to the varying radius R of the first cam track 52. FIGS. 4D to 4G show the reorienting of the simulated cigarette part. FIG. 4G also shows the second, predetermined orientation 20 of the part carried by the product carrier. With the part in the second, predetermined orientation, the reorienting unit arrives upstream from the upward slope section 72 of the second cam track 70, see FIG. 1. Due to the upward slope section the engagement member moves upwards and disengages the simulated cigarette part. This is shown in FIG. 4H. At this stage the part is in the second, predetermined orientation and the first section of the reorienting unit is in the upper position.

Turning to FIGS. 4 and 5, the reorienting unit 40 comprises a first section 44 which moves between an upper position 48 and a lower position 49. A resilient member 47 in the form of a helical spring is provided in the reorienting unit and vertically displaces the first section and biases the first section in a downward direction. The resilient member acts on a second section 45 of the reorienting unit. The second section is fixed in the direction of a vertical unit axis 46.

Figure 9:
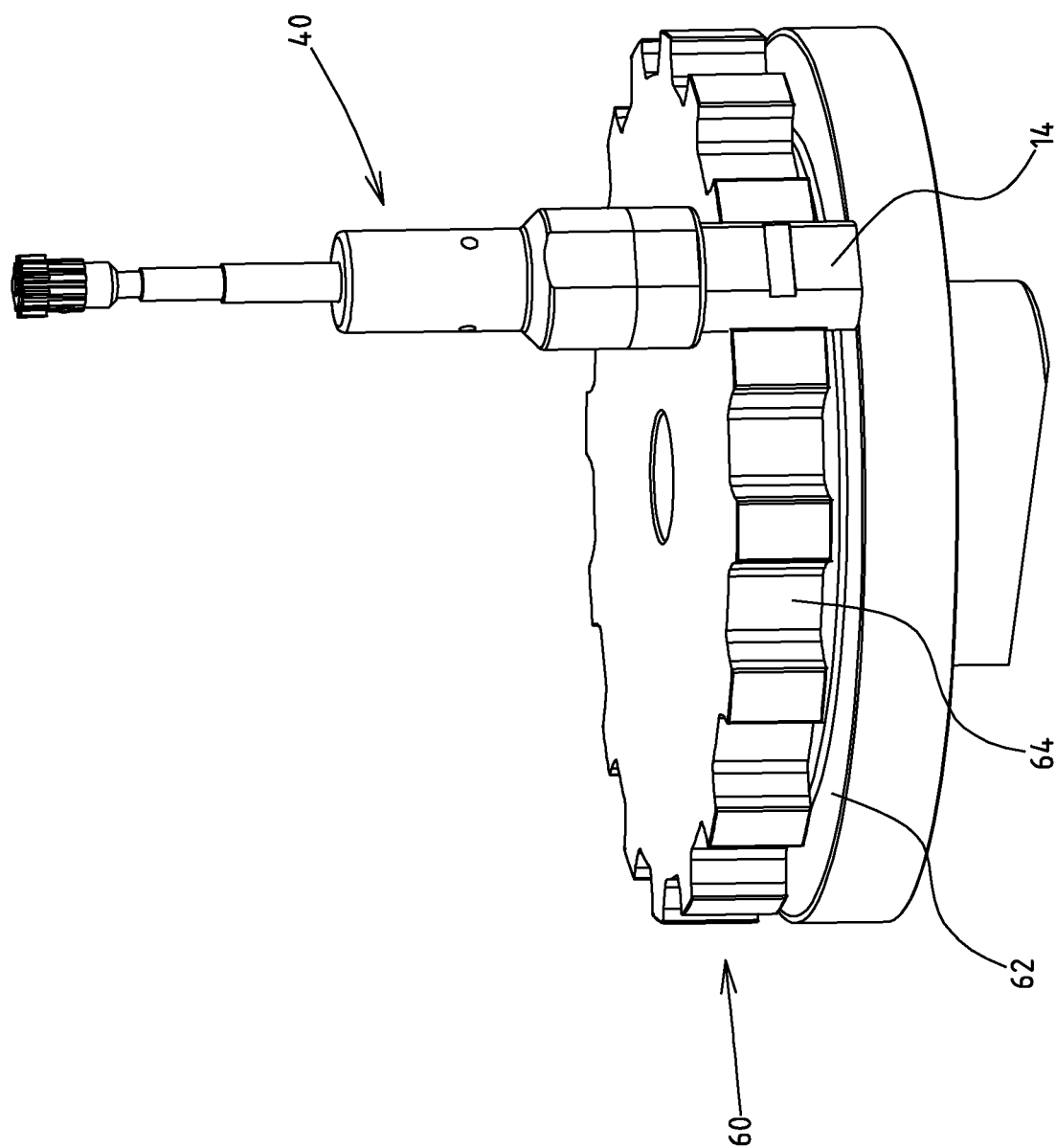
FIG. 9 shows an isometric view of the moving device with a product carrier holding a simulated cigarette part, with a reorienting device being engaged with the simulated cigarette part.
Figure 10:
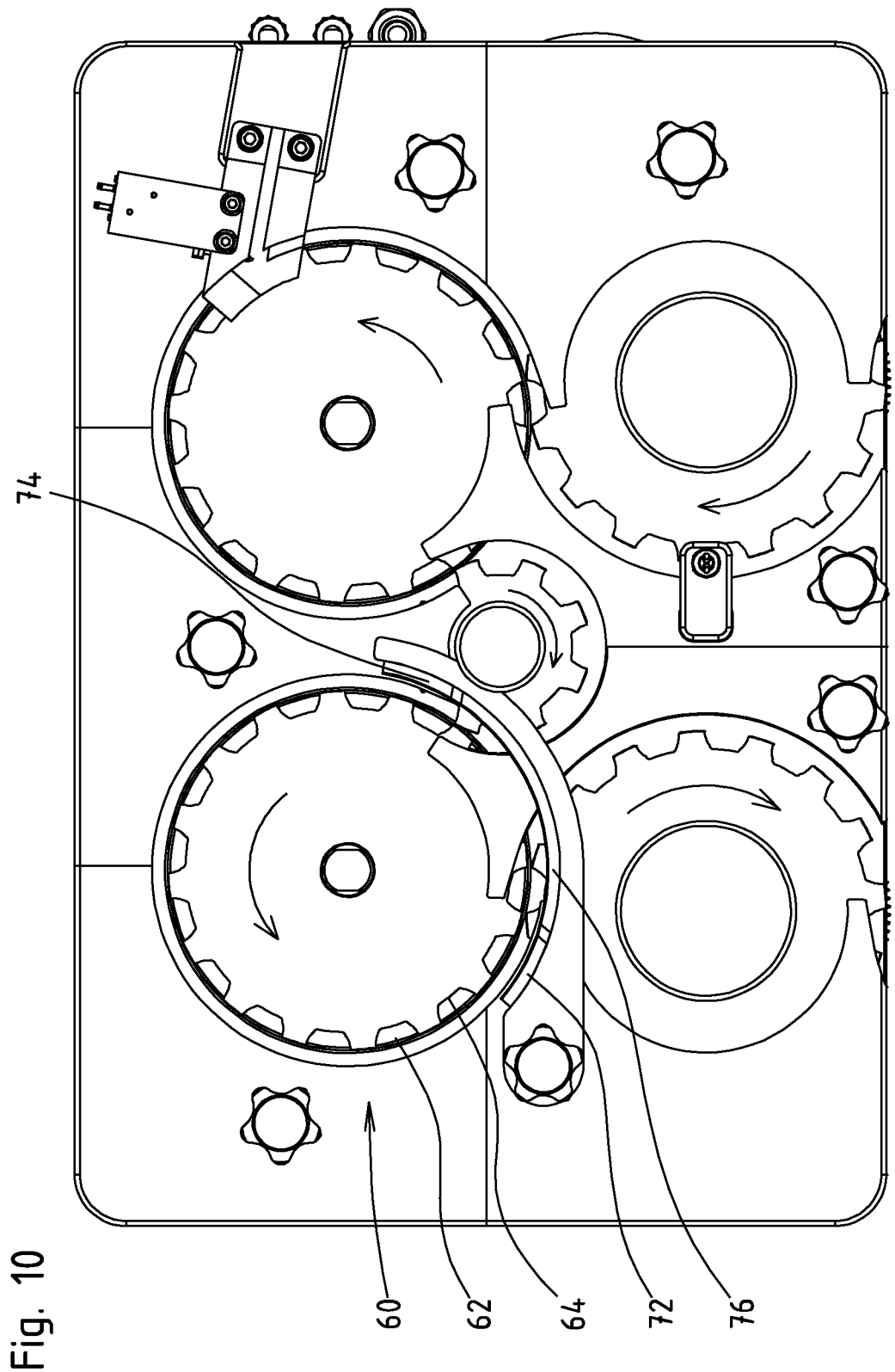
FIG. 10 shows a top view of an embodiment of the invention.

Turning to FIGS. 9 and 10, the reorienting device further comprises a moving device 60 for moving the product carriers. The moving device consists of a circular track 62 that is located underneath the reorienting units 40 and guides the product carriers 14 holding the simulated cigarette parts. The moving device comprises a plurality of product carrier movers 64 which move the product carriers along the said circular track underneath the reorienting units. The product carrier movers 64 are provided in a body which resembles a gear.

The product carriers are supported by the circular track 62 and are only pushed forward in a horizontal direction by the moving device.

The product carrier movers 64 maintain the angular position of the product carriers during the reorientation of the simulated cigarette part. The simulated cigarette parts are held by the product carriers.

The second cam track 70 as shown in FIG. 8 consists of an upward slope 72, a substantially horizontal section 76 and a downward slope section 74. The reorienting units arrive at an upstream end of the upward slope section in the lower position 49 and in an engaged state with a simulated cigarette part. Subsequently, the reorienting units engage the upward slope section and are displaced upwards by the upward slope section. This causes a disengagement of the reorienting units from the simulated cigarette parts. The reorienting units are then guided over the substantially horizontal section located downstream from the upward slope section and upstream from the downward slope section.

During the movement along the substantially horizontal section the first section of the reorienting units are in the upper position. At the downward slope section, downstream from the substantially horizontal section, the first section of the reorienting units is vertically displaced in a downward direction as it travels along the downward slope section. This makes it possible to engage the first section of each reorienting unit with a next simulated cigarette part.

The first cam track 22 extends in a plane which is substantially perpendicular to the main vertical rotation axis 24. The first cam track may be also stationary and/or endless. The second cam track is also stationary. However, the second cam track extends along a part of a trajectory of the reorienting units.

The rotary carrousel is intended to make a continuous movement in particular a rotary movement. This has the advantage of a high production rate.

Operation

In operation the following steps are carried out:
  feeding product carriers to the (circular) track of the reorienting device, and moving the product carriers along said track, wherein each product carrier carries a simulated cigarette part;
  engaging the simulated cigarette part with the engagement member of the first section of each reorienting unit by a downward movement of the first section of the reorienting unit, and;
  rotating the simulated cigarette part relative to the product carrier by a rotary movement of the reorienting unit to the second, predetermined orientation.

In the abovementioned steps:
  each cam is moved along the first cam track during the rotary movement of the carrousel, wherein the first cam track has a varying radius R causing a radial movement of the cam when the cam travels along the first cam track;
  each transmission gear attached to its respective cam rotates about its axis when the cam moves radially and engages the actuating gear of the reorienting unit and rotates the reorienting unit;

In operation the vertical displacement of the first section of the reorienting unit involves the steps:
  a) moving the reorienting unit by the rotary support frame, wherein the first section of the reorienting unit is in the lower position and is engaged with a simulated cigarette part;
  b) moving the reorienting unit along the upward slope section of the second cam track, wherein the first section of each reorienting unit is moved upward and disengages from the simulated cigarette part;
  c) moving the reorienting unit along the substantially horizontal section of the second cam track, wherein the first section of each reorienting unit is in the upper position and not engaged with any simulated cigarette part;
  d) moving the reorienting unit along the downward slope section, wherein the first section of each reorienting unit is vertically displaced in a downward direction as it moves along the downward slope section and engages a new simulated cigarette part;

e) moving the reorienting unit further along the track and rotating the reorienting unit, and subsequently reorienting the simulated cigarette part.

The abovementioned step e) comprises pressing the protrusion into a recess of the simulated cigarette part. The pressing is achieved due to the force of the resilient member. Thereby the lowest position of the first section of the reorienting unit is reached. In case the engagement member has a recess and the simulated cigarette part has a protrusion, a skilled person will understand the recess is pressed over the protrusion.

In operation, the first angular orientation of the simulated cigarette parts is arbitrary. The engagement member engages the simulated cigarette part carried by a product carrier. After engaging, the simulated cigarette part is rotated relative to the product carrier. So the following steps are carried out:

sliding the engagement member over the upper surface of the simulated cigarette part in a rotary manner until the engagement member fits into or over a mating shape of the simulated cigarette part, and pressing the engagement member into or over the mating shape by the force of the resilient member, and subsequently rotating the simulated cigarette part relative to the product carrier.

During the rotary movement of the reorienting units about the main vertical rotation axis, the first section of the reorienting units is displaced vertically.

It will be recognised that an embodiment may not achieve all of the stated objects.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A reorienting device for reorienting simulated cigarette parts which are carried by a product carrier about a vertical product axis from a first angular orientation to a second, predetermined orientation relative to said product carrier, wherein the device comprises:
   a main vertical rotation axis;
   a first cam track extending at least partially around the main vertical rotation axis;
   a rotary carrousel configured to rotate about the main vertical rotation axis, the rotary carrousel comprising:
      a rotary support frame;
      a plurality of reorienting units connected to the rotary support frame and arranged in a circular configuration when viewed in top view, each reorienting unit comprising an engagement member, wherein each engagement member is configured to engage the simulated cigarette part and to reorient it about a vertical product axis, wherein each reorienting unit comprises a first section which is rotatable relative to the rotary support frame about a vertical unit axis and is movable in a vertical direction between an upper position and a lower position, the upper position being a retracted position and the lower position being an engagement position; and
      a plurality of transmission mechanisms connected to the rotary support frame, each transmission mechanism being associated with a respective reorienting unit, each transmission mechanism comprising a cam which moves along the first cam track during the rotation of the rotary support frame, wherein the transmission mechanisms convert a movement of the cam into a rotation of the first section of the reorienting unit about the vertical unit axis relative to the rotary support frame;
   a moving device for moving the product carriers, the moving device comprising:
      a circular track located underneath the reorienting units and configured to guide the product carriers which hold the simulated cigarette parts; and
      a plurality of product carrier movers for moving the product carriers along the circular track underneath the reorienting units; and
   a second cam track configured to vertically displace the first section of the reorienting units.

2. The reorienting device according to claim 1, wherein the reorienting unit comprises:
   the first section which is movable between an upper position and a lower position and a second section which is fixed in a direction of the vertical unit axis; and
   a resilient member configured to vertically displace the first section and to bias the first section in a downward direction.

3. The reorienting device according to claim 1, wherein the first cam track has a varying radius relative to the main axis of rotation configured to cause a radial movement of the cam when the cam travels along the first cam track during the rotary movement of the rotary carrousel.

4. The reorienting device according to claim 1, wherein each transmission mechanism comprises a transmission gear which is attached to the cam, and wherein each reorienting unit comprises an actuating gear which extends around the unit axis and engages the transmission gear of the transmission mechanism.

5. The reorienting device according to claim 4, wherein a radial movement of the cam results in a movement of the transmission gear, and results in turn in a movement of the actuating gear.

6. The reorienting device according to claim 1, wherein the second cam track comprises:
   an upward slope section, wherein each reorienting unit is configured to arrive at an upstream end of the upward slope section in a lower position and in an engaged state with a simulated cigarette part, wherein the reorienting units are configured to engage the upward slope section and are moved upwards by the upward slope section, thereby causing a disengagement of the reorienting units from the simulated cigarette part; and
   a downward slope section located downstream from the upward slope section, wherein the downward slope section is configured to displace the first section of each reorienting unit in a downward direction in order to engage the first section of each reorienting unit with a next simulated cigarette part.

7. The reorienting device according to claim 1, wherein the first and second cam tracks are stationary.

8. The reorienting device according to claim 1, wherein the rotary carrousel is configured to make a continuous movement, in particular a rotary movement.

9. The reorienting device according to claim 1, wherein the first section comprises the engagement member which comprises a first mating part configured to engage a second mating part provided at the upper side of the simulated cigarette part.

10. The reorienting device according to claim 9, wherein the first mating part comprises a male or female centering part configured to concentrically align the engagement member with the simulated cigarette part, wherein a center of the first mating part is located on the vertical unit axis, and wherein the centering part protrudes beyond one or more side protrusions, which one or more side protrusions extend radially outward from the vertical unit axis.

11. The reorienting device according to claim 10, wherein the male or female centering part is conical.

12. The reorienting device according to claim 9, wherein the first section comprises the engagement member which comprises a protrusion configured to engage the mating shape provided in the upper side of the simulated cigarette part.

13. The reorienting device according to claim 1, wherein the first angular orientation of the simulated cigarette parts is arbitrary and wherein the engagement member is configured to:
engage simulated cigarette part; and
slide over the upper surface of the simulated cigarette part in a rotary manner until it fits into or over the mating shape of the simulated cigarette part; and to
subsequently be pressed into or over the mating shape by the force of the resilient member; and to
subsequently rotate the simulated cigarette part relative to the product carrier.

14. The reorienting device according to claim 1, wherein the product carrier movers are constructed to maintain the angular position of the product carriers when the simulated cigarette parts which are held by the product carriers are reoriented.

15. A method for reorienting simulated cigarette parts, the method comprising:
feeding product carriers to the track of the reorienting device according to claim 1, and moving the product carriers along said track, wherein each product carrier carries a simulated cigarette part;
engaging the simulated cigarette part with the engagement member of the first section of a reorienting unit by a downward movement of the first section of the reorienting unit; and
rotating the simulated cigarette part relative to the product carrier by a rotary movement of the reorienting unit to the second, predetermined orientation.

16. The method according to claim 15, wherein:
each cam is moved along the first cam track during the rotary movement of the carrousel, wherein the first cam track has a varying radius causing a radial movement of the cam when the cam travels along the first cam track; and
each transmission gear attached to its respective cam rotates about its axis when the cam moves radially and engages the actuating gear of the reorienting unit and rotates the reorienting unit.

17. The method according to claim 15, wherein the vertical displacement of the first section of the reorienting units comprises the steps:
a) moving the reorienting unit by the rotary support frame, wherein the first section of the reorienting unit is in the lower position and is engaged with a simulated cigarette part;
b) moving the reorienting unit along the upward slope section of the second cam track, wherein the first section of each reorienting unit is moved upward and disengages from the simulated cigarette part;
c) moving the reorienting unit along the substantially horizontal section of the second cam track, wherein the first section of each reorienting unit is in the upper position and not engaged with any simulated cigarette part;
d) moving the reorienting unit along the downward slope section, wherein the first section of each reorienting unit is vertically displaced in a downward direction as it moves along the downward slope section and engages a new simulated cigarette part;
e) moving the reorienting unit further along the track and rotating the reorienting unit, thereby reorienting the simulated cigarette part relative to the product carrier to the second, predetermined orientation.

18. The method according to claim 17, wherein step e) comprises pressing the engagement member into or over the mating shape of the simulated cigarette part due to the force of the resilient member, thereby reaching the lowest position of the first section of the reorienting unit.

19. The method according to claim 15, wherein the first angular orientation of the simulated cigarette parts is arbitrary, and wherein the engagement member is configured to engage the simulated cigarette part carried by a product carrier, the method further comprising:
sliding the engagement member over the upper surface of the simulated cigarette part in a rotary manner until the engagement member fits into a mating shape of the simulated cigarette part; and
pressing the engagement member into the mating shape by the force of the resilient member; and
subsequently rotating the simulated cigarette part relative to the product carrier to the second, predetermined orientation.

20. The method according to claim 15, wherein the vertical displacement of the first section of the reorienting units takes place during the rotary movement of the reorienting units about the main vertical rotation axis.

* * * * *